US010686886B2

(12) United States Patent
Fransazov et al.

(10) Patent No.: US 10,686,886 B2
(45) Date of Patent: Jun. 16, 2020

(54) ESTABLISHING SECURE SESSIONS FOR STATEFUL CLOUD SERVICES

(71) Applicant: Microsoft Technology Licensing, LLC, Redmond, WA (US)

(72) Inventors: Mariyan D. Fransazov, Kirkland, WA (US); Arnaud Christian Flutre, Sammamish, WA (US); Mark David Overholt, Bellevue, WA (US)

(73) Assignee: Mirosoft Technology Licensing, LLC, Redmond, WA (US)

( * ) Notice: Subject to any disclaimer, the term of this patent is extended or adjusted under 35 U.S.C. 154(b) by 350 days.

(21) Appl. No.: 15/298,044

(22) Filed: Oct. 19, 2016

(65) Prior Publication Data

US 2018/0109628 A1 Apr. 19, 2018

(51) Int. Cl.
| H04L 29/06 | (2006.01) |
| H04L 29/08 | (2006.01) |
| H04L 29/14 | (2006.01) |
| G06F 21/33 | (2013.01) |
| H04W 12/06 | (2009.01) |

(52) U.S. Cl.
CPC .......... *H04L 67/141* (2013.01); *G06F 21/335* (2013.01); *H04L 63/0428* (2013.01); *H04L 63/062* (2013.01); *H04L 63/08* (2013.01); *H04L 63/0807* (2013.01); *H04L 63/10* (2013.01); *H04L 67/2861* (2013.01); *H04L 69/40* (2013.01); *H04W 12/06* (2013.01)

(58) Field of Classification Search
None
See application file for complete search history.

(56) References Cited

U.S. PATENT DOCUMENTS

| 7,870,389 B1 | 1/2011 | Leung et al. |
| 3,219,609 A1 | 7/2012 | Bhattacharjee et al. |
| 3,447,881 A1 | 5/2013 | Paramasivam et al. |
| 3,499,336 A1 | 7/2013 | Alex et al. |
| 3,300,660 A1 | 3/2016 | Borowiec et al. |
| 2004/0193699 A1 | 9/2004 | Heymann et al. |
| 2008/0034198 A1 | 2/2008 | He et al. |
| 2010/0198972 A1* | 8/2010 | Umbehocker ........ G06F 3/0604 709/226 |
| 2010/0199089 A1 | 8/2010 | Vysogorets et al. |

(Continued)

FOREIGN PATENT DOCUMENTS

CN 103347085 10/2013

OTHER PUBLICATIONS

"International Search Report and Written Opinion Issued in PCT Application No. PCT/US2017/056239", dated Dec. 15, 2017, 13 Pages.

(Continued)

*Primary Examiner* — Natisha D Cox
(74) *Attorney, Agent, or Firm* — Fiala & Weaver P.L.L.C.

(57) ABSTRACT

Aspects of the present disclosure relate to establishing a secure session between a client device and a stateful backend server or host. The system described herein uses an identity token and an authorization token to generate a globally unique identifier that is associated with the client device. The globally unique identifier is then used to create a one-to-one mapping between the client device and the backend server.

20 Claims, 11 Drawing Sheets

(56) References Cited

U.S. PATENT DOCUMENTS

| | | | | |
|---|---|---|---|---|
| 2011/0141124 | A1* | 6/2011 | Halls | G06F 21/83 345/522 |
| 2012/0260227 | A1 | 10/2012 | Shukla et al. | |
| 2014/0373126 | A1 | 12/2014 | Hussain et al. | |
| 2015/0007274 | A1 | 1/2015 | Chang et al. | |
| 2015/0092551 | A1 | 4/2015 | Moisand et al. | |
| 2015/0350188 | A1* | 12/2015 | Gilpin | G06F 21/33 726/9 |
| 2016/0134606 | A1* | 5/2016 | Akhter | H04L 9/0833 726/14 |
| 2016/0134616 | A1* | 5/2016 | Koushik | H04L 63/0807 726/9 |
| 2016/0134660 | A1* | 5/2016 | Ponsini | H04L 9/3234 726/1 |
| 2016/0314299 | A1* | 10/2016 | Almer | G06F 21/6218 |
| 2016/0380992 | A1* | 12/2016 | Boodman | G06F 21/335 726/7 |
| 2017/0118218 | A1* | 4/2017 | Koottayi | H04L 63/102 |
| 2017/0289185 | A1* | 10/2017 | Mandyam | H04L 63/1425 |
| 2017/0289197 | A1* | 10/2017 | Mandyam | H04L 9/0825 |
| 2017/0374088 | A1* | 12/2017 | Pappu | H04L 63/1416 |
| 2018/0324173 | A1* | 11/2018 | Ananthapur Bache | H04L 63/0815 |

OTHER PUBLICATIONS

Demchenk, Yuri, "Security Architecture for Open Grid Services and related developments GGF5 and follow-on developments overview", Published on: Oct. 2, 2002, 7 pages Available at: http://www.uazone.org/demch/analytic/ggf5ogsa-security.html.

Connolly, P. J., "OAuth Is the New Hotness in Identity Management", Published on: Apr. 24, 2010, 5 pages Available at: http://www.eweek.com/c/a/Security/OAuth-Is-the-New-Hotness-In-Identity-Management-572745.

* cited by examiner

ESTABLISHING SECURE SESSIONS FOR STATEFUL CLOUD SERVICES

BACKGROUND

When creating, editing or otherwise accessing content stored on the cloud, it may be desirable to have the backend service maintain all the information about that content. This is generally referred to as a stateful service. As the backend service maintains the information about the content, it may be desirable for a user to have access to the content in a secure manner regardless of the device they are using.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to establishing a secure session between a client device and a stateful backend server or host. Once the secure session is established, the client device can create, edit, or otherwise access content such as, for example, documents, applications, and other content, stored on the cloud, a cloud service or otherwise hosted by a backend server. In some instances, it may be desirable to create a one-to-one mapping between the client device and the stateful host such that each time the client device wants to access the content, the client device is routed to the same stateful host or a new instantiation of the stateful host. It may also be desirable to create a one-to-one mapping between a particular user and the stateful host such that the user can access content stored on the cloud regardless of the client device used to access the content.

Accordingly, a method for establishing a communication session between a client device and a stateful host hosted by a cloud service is described. According to this method, an identity token associated with the client device, or a user of the client device, is provided to an authorization service. Using the identity token, a determination is made as to whether the client device is authorized to access the stateful host. When it is determined that the client device is authorized to access the stateful host, an authorization token is generated. The authorization token includes a unique identifier associated with the client device. The unique identifier is used to generate the stateful host on a virtual machine. An internet protocol address associated with the stateful host is then determined. The internet protocol address is associated with the unique identifier to create a name-value pair. The name-value pair may then be used to establish the communication session between the client device and the stateful host.

Also described is a system comprising a processor and a memory for storing instructions which, when executed by the processor, performs a method for establishing a communication session between a client device and a stateful host. This method includes receiving a unique identifier from the client device, the unique identifier being associated with a client identification token and a client authorization token. The unique identifier is then used to determine an internet protocol address for a stateful host associated with the client device. Once the internet protocol address for the stateful host is known, the communication session is established between the client and the stateful host using the unique identifier, the client identification token and the client authorization token.

Embodiments of the present disclosure also describe a computer-readable storage medium comprising computer-executable instructions which, when executed by a processor, performs a method for establishing a communication session between a client and a stateful host. This method includes generating an authorization token that includes a unique identifier associated with the client. The unique identifier is used to instantiate the stateful host on a virtual machine. An internet protocol address associated with the stateful host is determined and associated with the unique identifier to create a name-value pair. The name-value pair may then be used to establish the communication session between the client and the stateful host.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
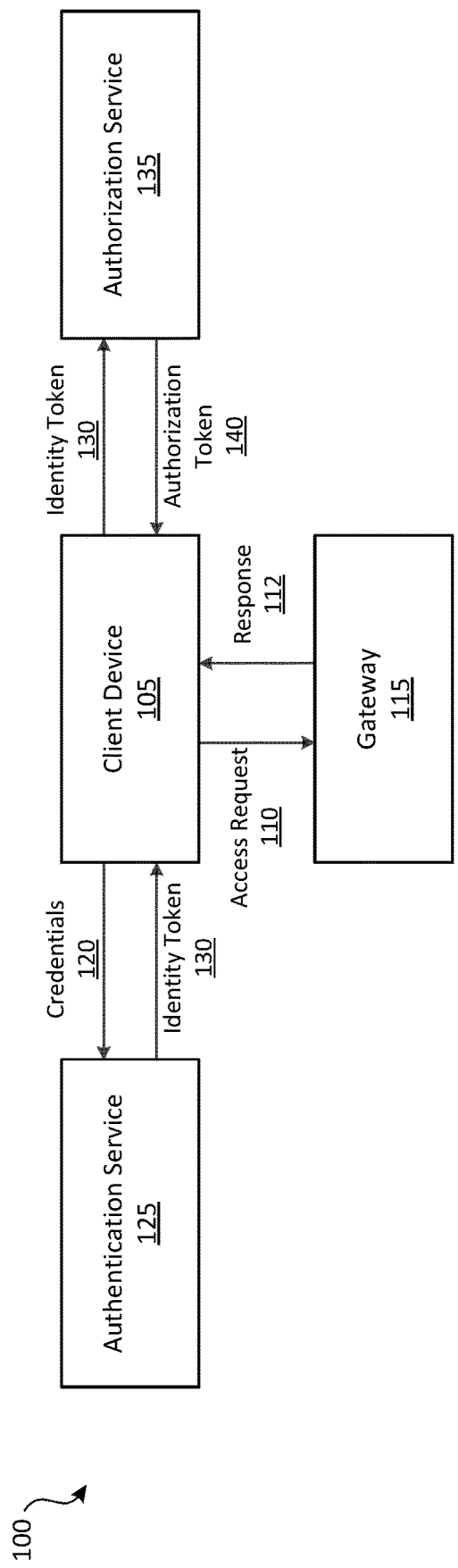
FIG. 1 illustrates various components of an example system for establishing a secure communication session between a client device and a stateful backend server.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Embodiments of the present disclosure are directed to establishing a secure communication session between a client device and a stateful backend server or host. In some embodiments, the stateful host is associated with a cloud service that enables the client device to access the service via a webpage or application executing on the client device. For example, the client device may provide a webpage to a user that enables the user to access the cloud and generate content. This content may include, but is not limited to, documents, applications, video content, picture content and so on. In one specific but non-limiting example, the stateful host is a virtual server that enables the client device to create an application, such as, for example, a POWERAPPS application by MICROSOFT Corp. of Redmond Wash.

In certain embodiments, the backend server or host is stateful. As such, it maintains its own state, and also maintains the current state (or last known state) of any content (e.g., an application, document and so on) that it hosts. This helps ensure that the content behaves in a uniform manner each time it is accessed by the client device or any other client device associated with the user that created, edited or otherwise accessed the content.

Accordingly, embodiments of the present disclosure describe creation of a unique identifier that is used to create a one-to-one relationship between a client device and a stateful host. As will be described in greater detail below, the unique identifier is generated based, at least in part, on an identification credentials and authorization credentials associated with a user of the client device. Once created, the unique identifier may be sent to and stored by the client device. Other components of the system may also use the unique identifier to spawn or otherwise create an instance of the stateful host on a virtual machine.

Once the stateful host has been created, the internet protocol address, along with the port associated with the stateful host, is determined. The internet protocol address and port are associated with the unique identifier to create a name-value pair. In some instances, the name-value pair is stored in a system storage that is accessible by the various components of the system.

When the client device seeks to establish, or reestablish, a connection with the stateful host, the client device provides the unique identifier to a gateway server. The gateway server uses the unique identifier to look up the name-value pair stored in the system storage. Using the unique identifier, the gateway server determines the internet protocol address and port that the client device should be routed to in order to access the stateful host. The gateway server may also instruct a backend service to instantiate the stateful host if it is not currently active. The gateway server may also instruct the backend service, upon the request of the client, to load the last known or most recent state of the content.

These and other embodiments will be described in more detail below with respect to FIGS. 1-10.

FIGS. 1-4 illustrate an example system 100 that enables a client device 105 to establish a secure communication session with a stateful host. For purposes of clarity, each of FIGS. 1-4 illustrate additional components of the system 100 as they are needed to establish the secure communication session between the client and the stateful host.

As shown in FIG. 1, the system 100 may be accessed by a client device 105. The client device 105 may enable a user to create, edit, store or otherwise access content stored on the cloud or otherwise hosted by a cloud service. This is referred to herein as an authoring session. Accordingly, the client device 105 may send an access request 110, over a network or internet connection, to a gateway 115. For example, the user of the client device 105 may access a webpage displayed on the client device 105 and request that the gateway 115 create an authoring session. The gateway 115 may be a publically visible server device that is used to route requests from the client device 105 to an appropriate stateful host or other backend service such as will be described below.

In some embodiments, the client device 105 may be any computing device capable of creating, accessing, editing or otherwise generating content. For example, the client device 105 may be a desktop computer, a laptop computer, a tablet computing device, a mobile phone, a personal digital assistant or other such portable computing device. Although a single client device 105 is shown, multiple client devices may access the system 100.

Further, it is contemplated that a single user may have access to multiple client devices 105. However, even though the user may have access to multiple different client devices 105, the embodiments described herein enable the user to access the same stateful host or backend server, and thus the most recent state of the content hosted by the stateful host, regardless of which client device 105 is used to request the authoring session.

When requesting the authoring session, the client device 105 sends an access request 110 to the gateway 115. Once the access request 110 is processed, the gateway 115 returns a response 112 to the client device 105. In this particular non-limiting example, the response 112 may include a request that the client device 105, and/or the user of the client device 105, be authenticated.

In response, the client device 105 submits credentials 120, such as, for example, a username and password associated with a user of the client device 105, to an authentication service 125. The authentication service 125 uses the credentials 120 to generate an identity token 130. The identity token 130 is then communicated to the client device 105.

In some embodiments, the authentication service 125 is a multi-tenant cloud based directory and identity management service that is used to authenticate a variety of different client devices 105. Although shown as a separate component in the system 100, the authentication service 125 may be part of or otherwise associated with the gateway 115. In other implementations, the authentication service 125 may be a stand-alone service.

Once the client device 105 has received the identity token 130, the client device 105 sends another access request 110, including the identity token 130, to the gateway 115 and requests creation of the authoring session or otherwise requests access to the cloud. In response to this second request, the gateway 115 sends another response 112 that requires the client device 105 to verify its authorization or otherwise obtain authorization to access the cloud.

In order to comply with the second response 112, the client device 105 provides the identity token 130 (also referred to as an authentication token) to an authorization service 135. In addition to providing the identity token 130 to the authorization service, the client device 105 may also include a request for specific resources and specific access to those resources. For example, the request may include a request for editing and/or creation privileges for content stored in the cloud.

The authorization service 135 may determine, using the identity token 130, whether the client device 105 is authorized to access the content in the cloud. In some embodiments, an authorization server associated with the authorization service 135 may be used to verify whether the client device 105 is authorized to access the cloud and what, if any, editing privileges the client device 105 has. If the client device 105 is authorized, the authorization service 135 may generate an authorization token 140 for the client device 105. In some embodiments, the authorization token 140 includes a unique identifier 142 (shown in FIG. 2) that will subsequently be used to create a one-to-one mapping between the client device 105 and a stateful host hosted on the cloud or otherwise provided by a cloud service. Thus, each time the client device accesses the content in the cloud, the client device is routed to the same stateful host or an instantiation of the stateful host. Because the client device 105 essentially accesses the same stateful host each time the content is accessed, the content behaves in a uniform manner.

In addition to being associated with the authorization token 140, the unique identifier 142 may also be associated with the identity token 130. As such, a single user that has access to a number of different client devices 105 may use the identity token 130 to generate a similar authorization token 140 and unique identifier 142. This enables the user to access the content hosted by the stateful host, and also enables the creation of a new instance of the stateful host when required, regardless of the client device 105 being used by the user.

In some implementations, once the authorization token 140 has been generated, it is encrypted or otherwise signed by a security certificate. The encryption helps ensure that the authorization token 140 and its associated unique identifier 142, are readable by other components in the system 100 but are not be tampered with or otherwise changed. The encrypted authorization token 140 is then provided to the client device 105. In some instances, the client device 105 may store the authorization token 140, the identity token 130 and/or the unique identifier 142 in a persistent storage device. As will be explained in greater detail below, if a connection to the stateful host is lost, the unique identifier 142 may be used to reestablish a secure communication session between the client device 105 and the stateful host.

Now that the client device 105 has been authenticated and authorized, the client device 105 may use the authorization token 140, the unique identifier and the identity token 130 to access the cloud. For example, the client device 105 may submit a third access request 110, along with its tokens, to the gateway 115. The third access request 110 may include a request to begin an authoring session on the cloud. For example, the request 110 may request that a stateful host be generated by a virtual machine which may enable the client device 105 to generate or otherwise access content stored on the cloud. Although the figures show a single access request 110 and a single response 112, it should be understood that the access request 110 and the response 112 may include the various requests and responses described herein.

Figure 2:
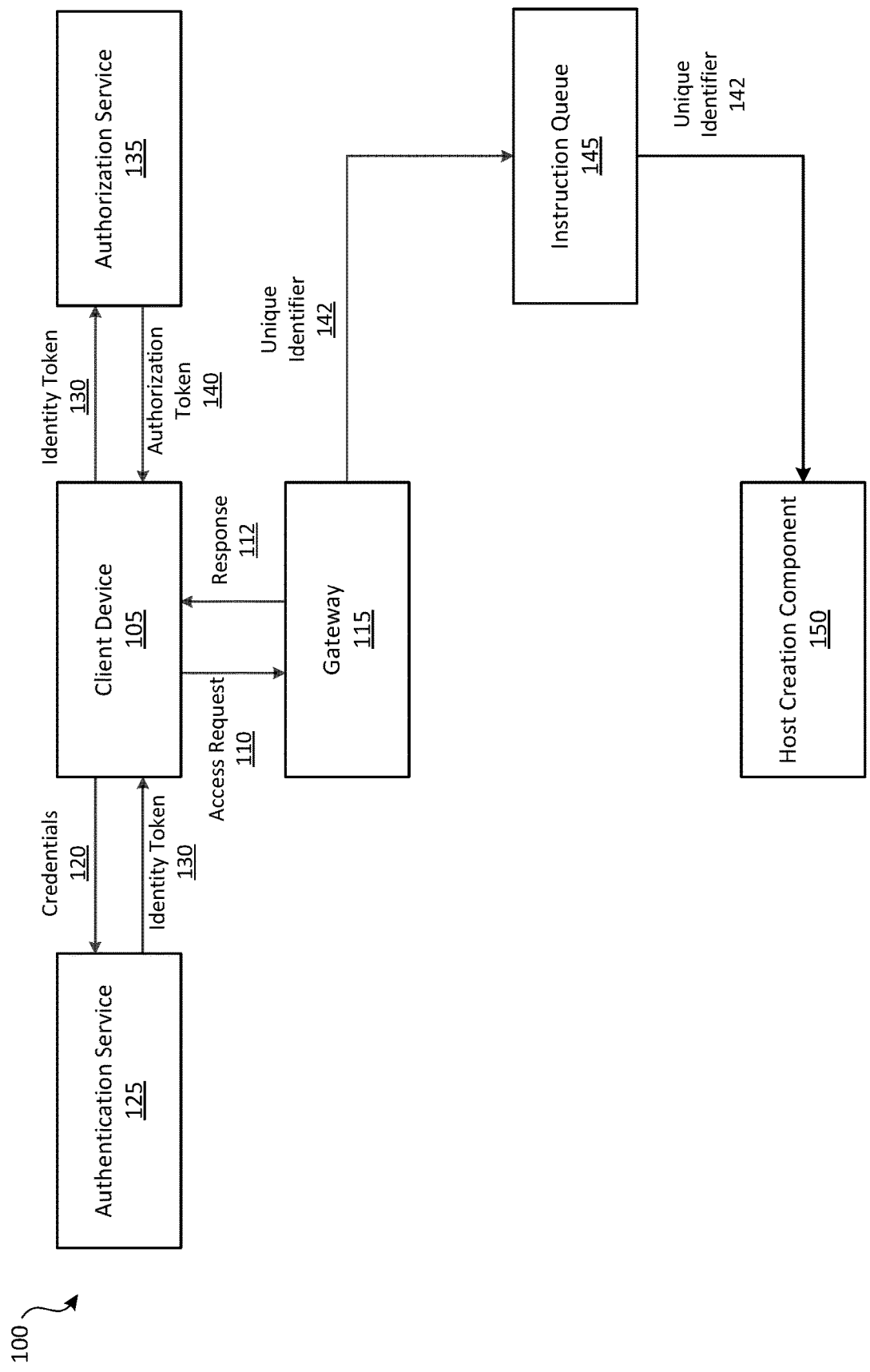
FIG. 2 illustrates additional components of the example system shown in FIG. 1 for establishing the secure communication session between the client device and the stateful backend server.

Referring now to FIG. 2, once the client device 105 sends the request to create the authoring session, along with the authorization token 140, the unique identifier 142 and the identity token 130, to the gateway 115, the gateway 115 provides the unique identifier 142 to an instruction queue 145. The instruction queue 145 may be a globally readable storage device that stores a variety of unique identifiers 142 and well as other instructions for the various components of the system 100.

As shown in FIG. 2, the system 100 also includes a host creation component 150. The host creation component 150 is configured to periodically check the instruction queue 145 to determine if new instructions and/or unique identifiers 142 have been added. In this example, when the host creation component 150 sees that the newly added unique identifier 142 is stored in the instruction queue 145, the host creation component 150 determines that a new stateful host should be instantiated for the client device 105.

Figure 3:
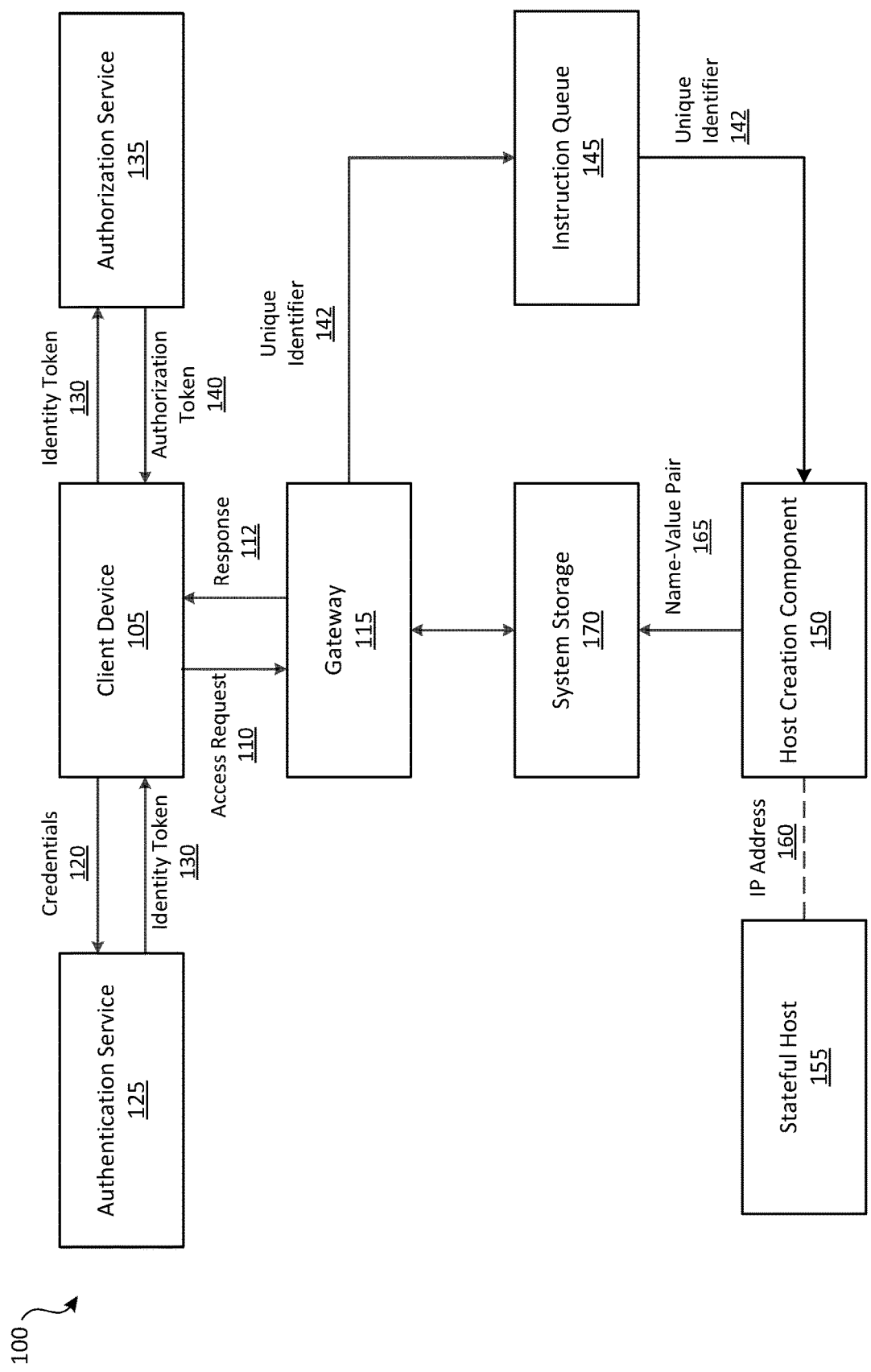
FIG. 3 illustrates additional components of the example system shown in FIG. 2 for establishing the secure communication session between the client device and the stateful backend server.
Figure 4:
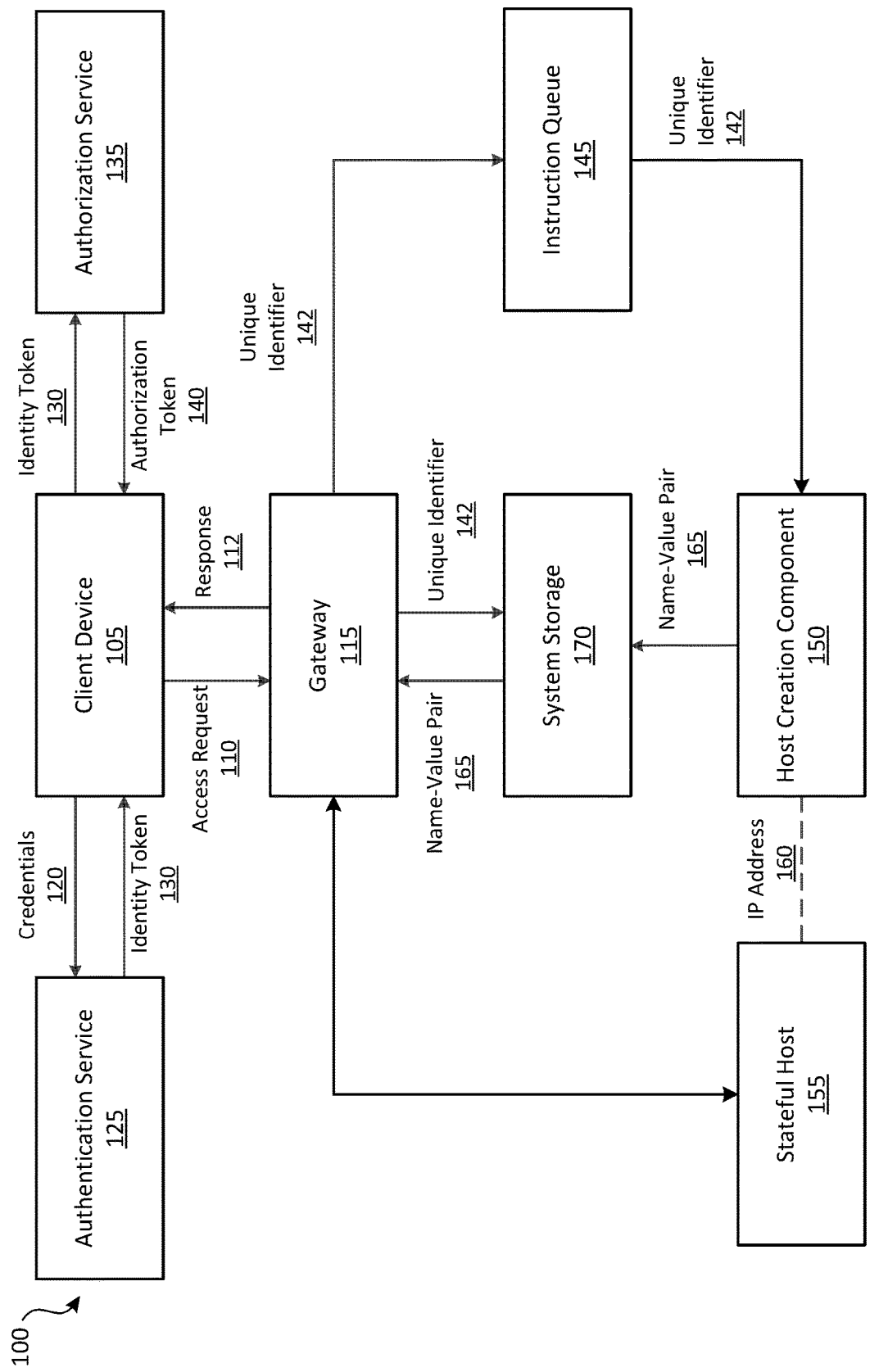
FIG. 4 illustrates a routing path between the client device and the stateful backend server.

As a result of the unique identifier being stored in the instruction queue 145, the host creation component 150 spawns or otherwise instantiates a stateful host 155. This is shown in FIG. 3.

In some implementations, the stateful host 155 is created on a virtual machine. As suggested by the name, the stateful host 155 is a stateful device that tracks or otherwise saves the state of the authoring session between the client device 105 and the stateful host 155. The stateful host 155 may also store or otherwise track the current state of any and all content created on, stored by or otherwise hosted by the stateful host 155.

Once the stateful host 155 has been created, the host creation component 150 determines the internet protocol address 160 and the port of the stateful host 155. The host creation component 150 may also verify that the stateful host 155 is functioning properly (e.g., broadcasting its internet protocol address 160 and port). The host creation component 150 generates a name-value pair 165 that is used to identify or is otherwise associated with the stateful host 155. In some embodiments, the name-value pair 165 includes the internet protocol address 160 (and optionally the port) of the stateful host 155 and the unique identifier 142. The name-value pair 165 is then provided to, and stored by, a system storage 170. As will be explained below, the name-value pair 165 is used to create a one-to-one mapping between the client device 105 and the stateful host 155. Thus, each time the client device 105 accesses the cloud, the client device 105 is routed to the same stateful host 155 or an instance of the stateful host 155.

In some embodiments, the system storage 170 is a cache, such as, for example, an Azure Redis Cache by MICROSOFT Corp. of Redmond, Wash., although other storage devices and caches may be used. In some implementations, the system storage 170 is only visible to the various components of the system 100. For example and as shown in FIG. 3, the system storage 170 may be accessed by the host creation component 150 and the gateway 115.

Once the stateful host 155 has been created, the client device 105 may access it. For example, the client device 105 may send an access request 110, including for example, the unique identifier 142 (and in some implementations, the authorization token 140 and the identity token 130) to the gateway 115. The gateway 115 verifies that the client device 105 is still authorized and authenticated and relays the unique identifier 142 to the system storage 170.

The system storage 170 uses the unique identifier 142 to determine the name-value pair 165 it is associated with. Once found, the name-value pair 165 is sent back to the gateway 115. As discussed above, the name-value pair 165 includes the internet protocol address 160 (and optionally the port) of the stateful host 155 that was created for the authoring session requested by the client device 105. The gateway 115 uses the internet protocol address 160 associated with the unique identifier 142 to route the client device 105 to the stateful host 155 using or otherwise broadcasting the internet protocol address 160 and port. Once connected, the client device 105 may edit content hosted by the stateful host 155.

The system 100 may also be configured to recover from various unexpected events. These events include, but are not limited to, recovering from and reestablishing the secure communication session between the client device 105 and the stateful host 155 if the client device 105 crashes or otherwise ceases to function, recovering from and reestablishing the secure communication session between the client device 105 and the stateful host 155 if the stateful host 155 crashes or otherwise ceases to function, and recovering from and reestablishing the secure communication session between the client device 105 and the stateful host 155 if the gateway 115 crashes or if the network connection between the client device 105 and the stateful host 155 is severed.

In instances in which the client device 105 crashes, the stateful host 155 may remain active for a predetermined period of time (e.g., 2 hours although other time periods are contemplated). During this time, the stateful host 155 may broadcast its port and/or internet protocol address 160 and wait for the client device 105 to reconnect.

In order to reconnect to the stateful host 155, the client device 105 accesses the authorization token 140, and more specifically, the unique identifier 142 stored in its persistent storage (such as described above). The unique identifier 142 is sent to the gateway 115. The gateway 115 accesses the system storage 170 and uses the unique identifier 142 to determine the internet protocol address 160 associated with the unique identifier 142. The gateway 115 then routes the client device 105 to that particular internet protocol address 160 and reestablishes the communication session with the stateful host 155.

In some embodiments, the stateful host 155 is configured to auto save the content it hosts after a predetermined amount of time. For example, the stateful host 155 may auto save content every thirty seconds although other time periods may be used. This auto save feature may be used to help the stateful host 155 recover if it crashes.

In situations in which the stateful host 155 crashes, the gateway 115 may be aware of the crash, even if the client device 105 is not. In response to determining that the stateful host 155 has crashed, the gateway 115 automatically starts a sequence to create a new instance of the stateful host 155 using the unique identifier 142. This sequence is similar to the sequence described above.

For example, once the gateway 115 determines that the stateful host 155 has crashed, the gateway 115 sends the unique identifier 142 to the instruction queue 145. Once the host creation component 150 sees the unique identifier 142 in the instruction queue, it generates a new instance of the stateful host 155. This new instance of the stateful host 155 has the same properties, port and internet protocol address 160 of the previous stateful host 155.

The host creation component 150 may also cause the new instance of the stateful host 155 to load the last known state of the content the previous stateful host (e.g., the stateful host that crashed) was hosting. In some embodiments, the instructions to load the last known state of the content may be provided to the new instantiation of the stateful host 155 by the host creation component 150 or it may be provide to the new instantiation of the stateful host 155 directly by the gateway 115.

Once the new instantiation of the stateful host 155 is running, the gateway 115 may route the client device 105 to the new instantiation of the stateful host 155 using the internet protocol address 160 and the associated port.

In cases in which the gateway 115 crashes or the network connection is severed, the client device 105 may use another server to access the stateful host 155 so long as the new server has access to the system storage 170. If so, the client device 105 provides the unique identifier 142 to the new server which accesses the system storage 170 to find the appropriate internet protocol address of the stateful host 155 such as described above. The new server then routes the client device 105 to the stateful host 155.

Figure 5:
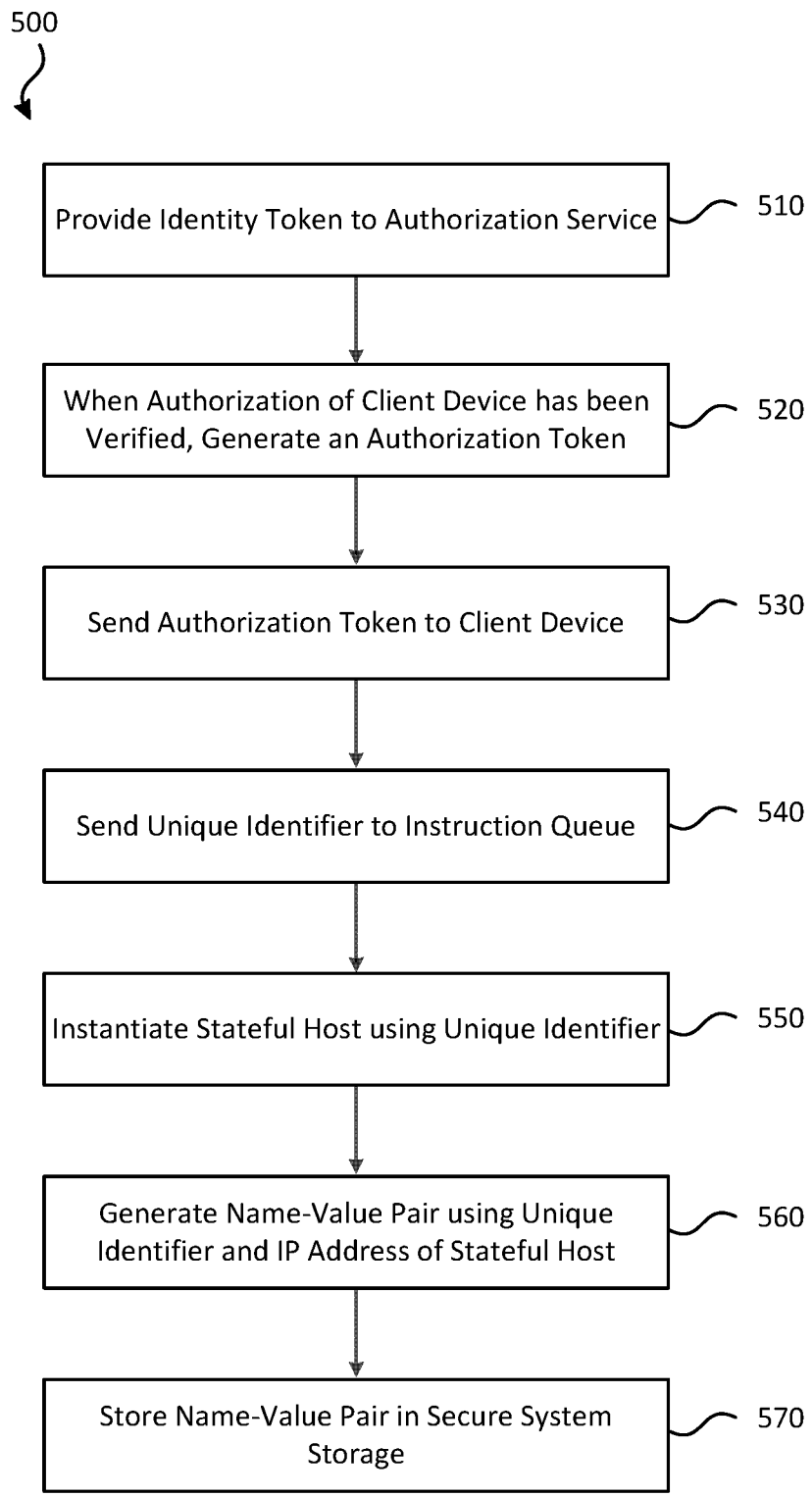
FIG. 5 illustrates a method for establishing a communication session between a client device and a stateful host.

FIG. 5 illustrates a method 500 for establishing a secure communication session between a client device and a stateful host. In some embodiments, the method 500 may be used by the system 100 shown in FIGS. 1-4 to enable the client device 105 to establish an authoring session with a stateful host 155. As such, reference may be made to similar components of the system 100 described above.

Method 500 begins at operation 510 in which an identity token associated with a client device (e.g., client device 105 (FIG. 1)) is provided to an authorization service. For example, when the client device seeks to start an authoring session on the cloud, the client device sends a cloud access request to a server (e.g., gateway 115 (FIG. 1)). In response to the request, the server may require that the client device verify its authorization to access the cloud and/or edit the hosted content.

In response to the authorization request, the client device submits its identification token to an authorization service. The authorization service may use the identification token to ensure that the client device is indeed authorized to access and edit content on the cloud.

Flow then proceeds to operation 520 and the authorization service generates an authorization token for the client device. In some embodiments, the authorization token includes a globally unique identifier that may subsequently be used to create a one-to-one mapping between the client device and an instantiated stateful host. The authorization service may also be configured to sign the authorization token with a security certificate to encrypt the authorization token.

Once the authorization token and the globally unique identifier has been generated, flow proceeds to operation 530 and the authorization token is provided to the client device.

Now that the client device has been identified (e.g., using the identity token) and authorized, the client device may submit the authorization token, including the globally unique identifier (and optionally the identification token) to the server. The server then sends 540 the globally unique identifier associated with the authorization token to an instruction queue.

As described above, the instruction queue may be a storage device that is readable by other components of the system. Once the instruction queue receives the globally unique identifier, a host creation component uses the globally unique identifier to instantiate 550 a stateful host. For example, the host creation component may monitor the instruction queue for newly added globally unique identifiers and/or associated instructions to instantiate new stateful hosts. Upon receipt of this data, the host creation component spawns a stateful host. In some instances, the stateful host is spawned or otherwise generated on a virtual machine or server.

The host creation component may also be configured to determine the internet protocol address and the port of the stateful host. The host creation component then associates the globally unique identifier with the internet protocol address to generate 560 a name-value pair.

Flow then proceeds to operation 570 and the name-value pair is securely stored in a system storage. In some embodiments, the secure system storage is a cache, such as, for example, a Redis Cache or other type of cache or storage device hosted by a cloud servicer or otherwise accessible in the cloud. Once the name-value pair has been stored in the system storage, the globally unique identifier may be used to determine the internet protocol address of the stateful host such that there is a one-to-one mapping between the client device and the stateful host.

Figure 6:
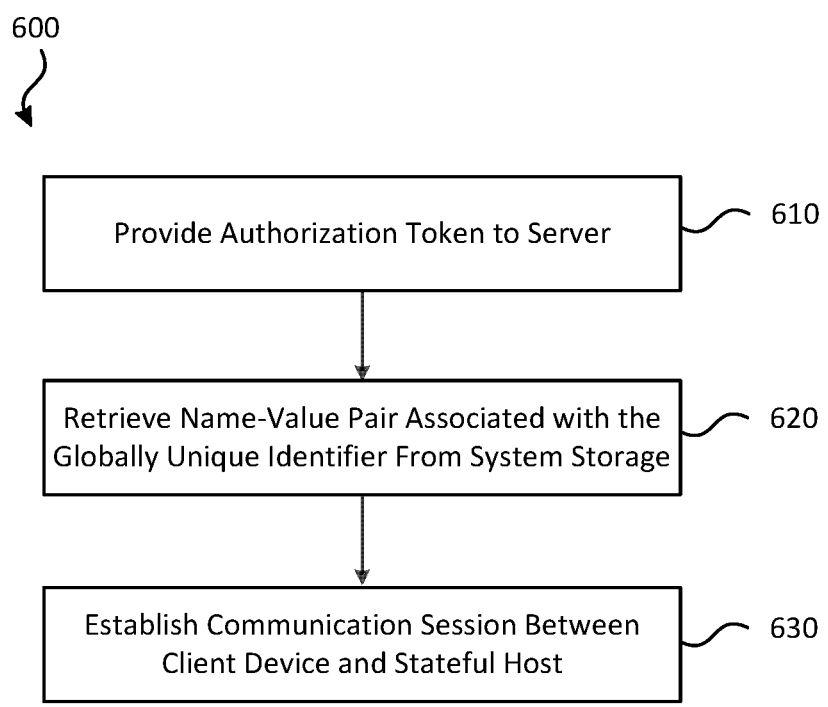
FIG. 6 illustrates another method for establishing a communication session between a client device and a stateful host.

FIG. 6 illustrates another method 600 for establishing a communication session between a client device and a stateful host. In some implementations, the method 600 may be a continuation of the method 500 of FIG. 5. In other instances, the method 600 may be used by a client device to reestablish a connection with the stateful host or to cause a new instantiation of the stateful host.

Method 600 begins at operation 610 in which an authorization token, including a globally unique identifier (and optionally an identity token) is provided to a server. In some instances, a client device stores the authorization token and the associated globally unique identifier in a persistent storage. As such, the client device may send this information to the server in order to start or reestablish an authoring session on a stateful host.

Once the server receives the authorization token and the globally unique identifier, flow proceeds to operation 620 and the server retrieves a name-value pair associated with the globally unique identifier from a system storage. As discussed above, the name-value pair includes the internet protocol address and port information associated with the stateful host that was generated to service this particular client device. In some implementations, the system storage may also include other information about previously established authoring sessions between the client device and the stateful host.

Once the name-value pair has been retrieved by the server, flow proceeds to operation 630 and the server establishes a communication session between the client device and the stateful host. Accordingly, the client device may access, generate, or otherwise edit content stored on the cloud.

In some instances, the stateful host 155 may no longer be active when the client device seeks to reestablish the communication session. In such cases, the server may transmit the globally unique identifier to an instruction queue. When a host creation component sees that the globally unique identifier has been added to the instruction queue, the host creation component generates a new instance of the stateful host. In some embodiments, the host creation component 150 may access the system storage to determine the internet protocol address of the previous instantiation of the stateful host and reuse the internet protocol address. The server may then route the client device to the newly created instance such as described above.

In some embodiments, the stateful host may be configured to auto save the content at various time intervals. The stateful host may also store additional information about the established session. Thus, when the client device subsequently reestablishes a connection to the stateful host or a new instantiation of the stateful host is generated, the new authoring session may commence where the old authoring session terminated.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of electronic device configurations that may be utilized for practicing aspects of the disclosure, as described herein.

Figure 7:
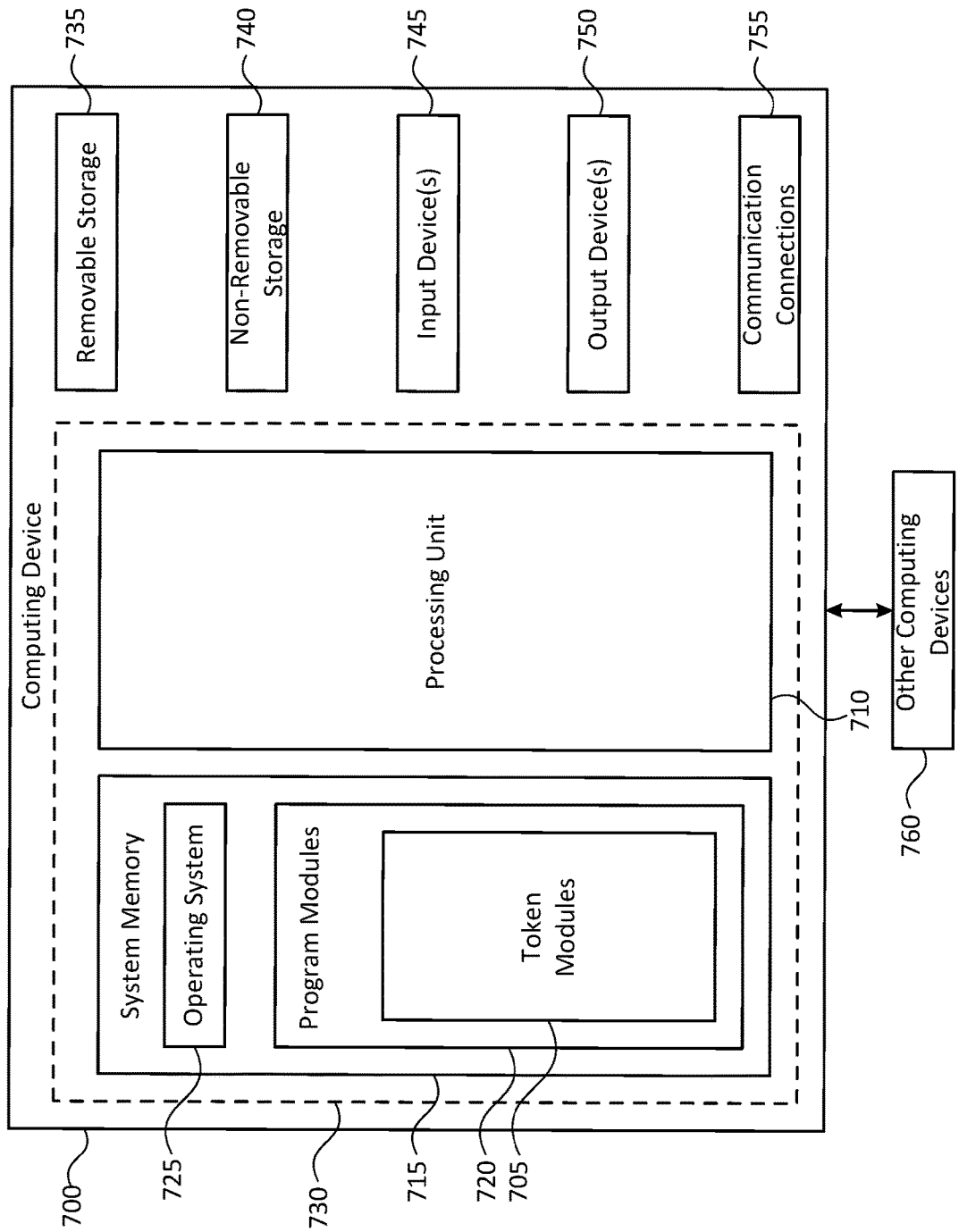
FIG. 7 illustrates example physical components of an electronic device with which aspects of the disclosure may be practiced.

FIG. 7 is a block diagram illustrating physical components (e.g., hardware) of an electronic device 700 with which aspects of the disclosure may be practiced. The components of the electronic device 700 described below may have computer executable instructions for establishing a secure communication session with a stateful host such as described above.

In a basic configuration, the electronic device 700 may include at least one processing unit 710 and a system memory 715. Depending on the configuration and type of electronic device, the system memory 715 may comprise, but is not limited to, volatile storage (e.g., random access memory), non-volatile storage (e.g., read-only memory), flash memory, or any combination of such memories. The system memory 715 may include an operating system 725 and one or more program modules 720. The program modules 720 may include token modules 705 that are used to generate or otherwise store the various tokens and identifiers described above.

The operating system 725, for example, may be suitable for controlling the operation of the electronic device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 730.

The electronic device 700 may have additional features or functionality. For example, the electronic device 700 may also include additional data storage devices (removable and/or non-removable) such as, for example, magnetic disks, optical disks, or tape. Such additional storage is illustrated in FIG. 7 by a removable storage device 735 and a non-removable storage device 740.

As stated above, a number of program modules and data files may be stored in the system memory 715. While executing on the processing unit 710, the program modules 720 may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The electronic device 700 may also have one or more input device(s) 745 such as a keyboard, a trackpad, a mouse, a pen, a sound or voice input device, a touch, force and/or swipe input device, etc. The output device(s) 750 such as a display, speakers, a printer, etc. may also be included. The aforementioned devices are examples and others may be used. The electronic device 700 may include one or more communication connections 755 allowing communications with other electronic devices 760. Examples of suitable communication connections 755 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 715, the removable storage device 735, and the non-removable storage device 740 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 700. Any such computer storage media may be part of the electronic device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
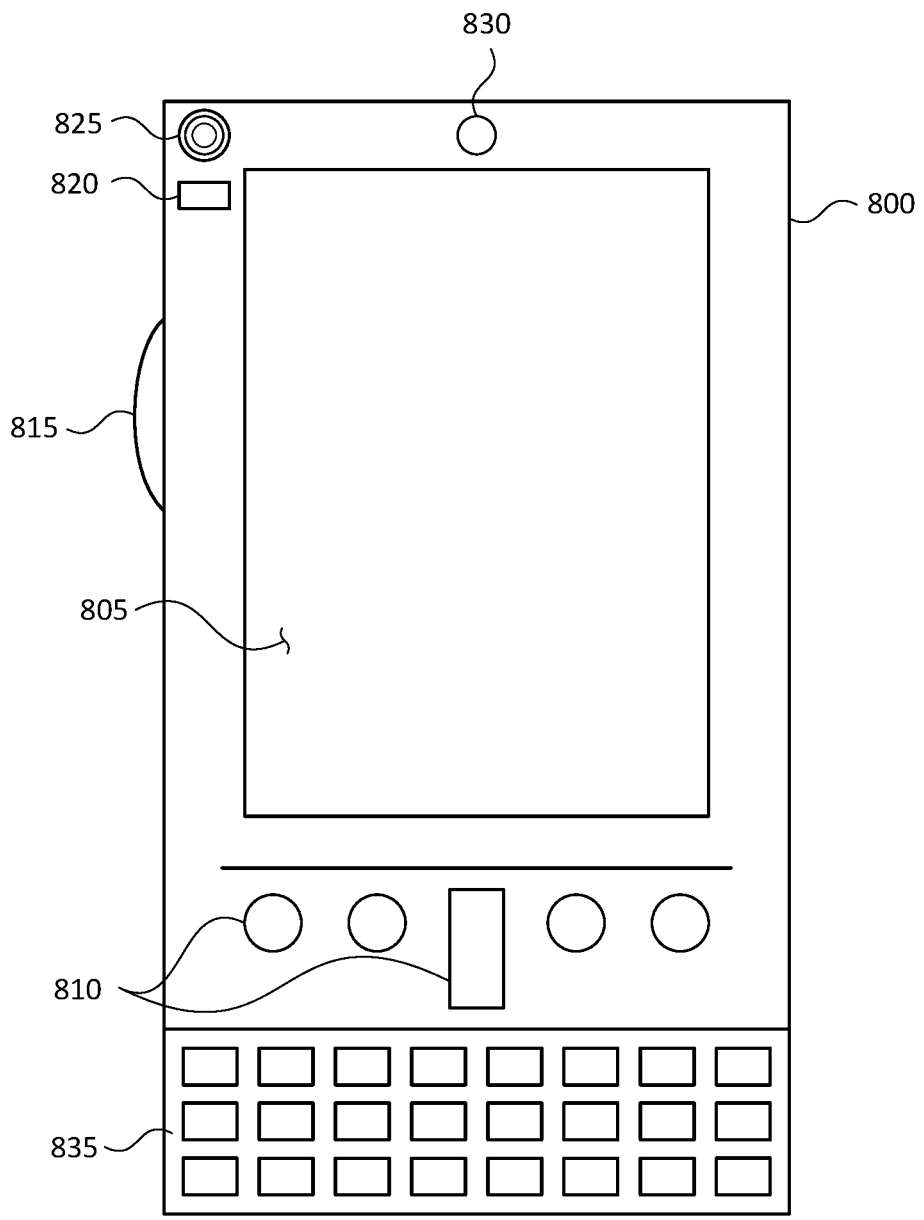
FIG. 8A illustrates an example electronic device with which aspects of the present disclosure may be practiced.
Figure 8B:
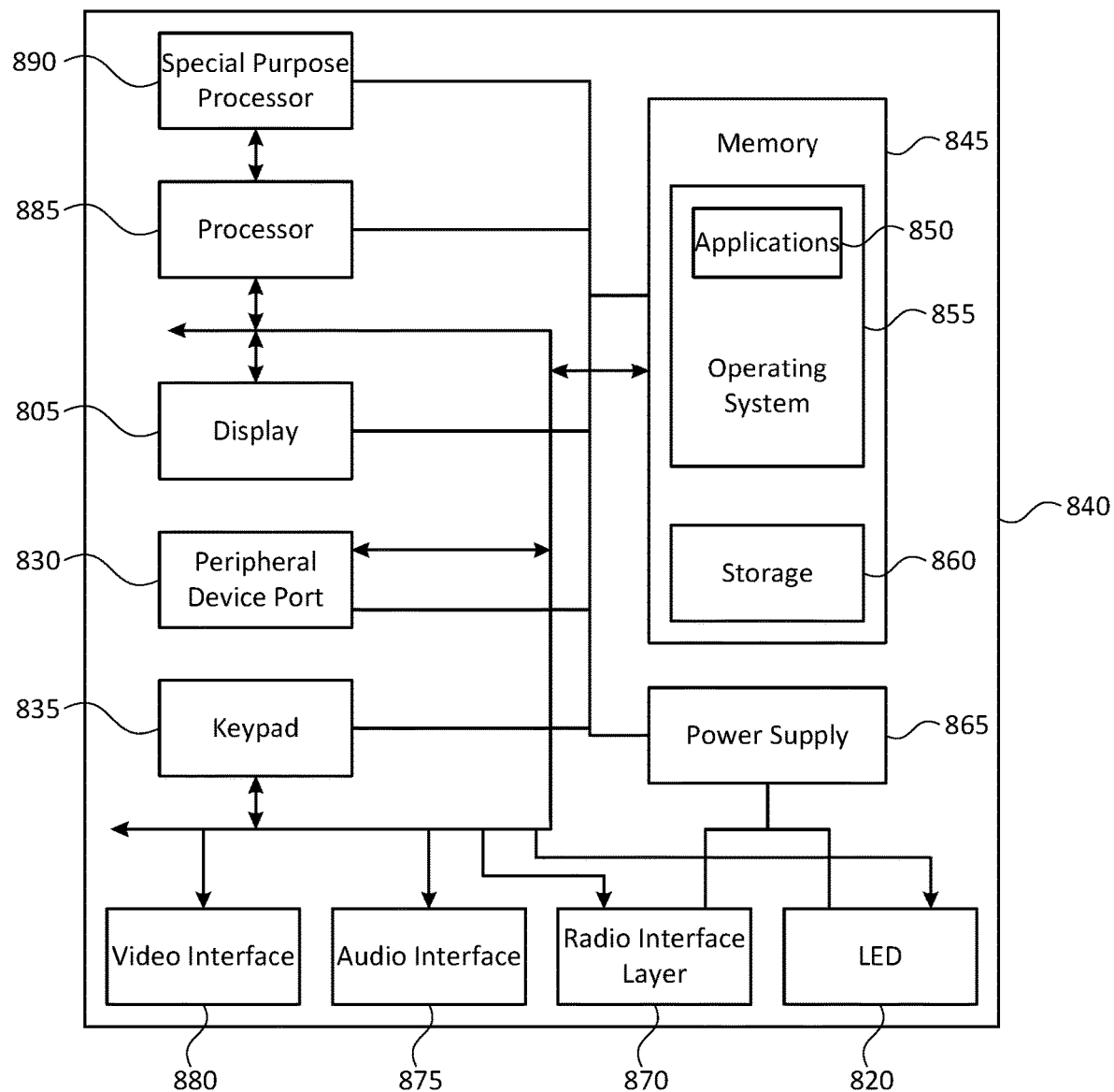
FIG. 8B is a block diagram that illustrates example components of the electronic device of FIG. 8A.

FIGS. 8A and 8B illustrate a mobile electronic device 800, for example, a mobile telephone, a smart phone, wearable computer (such as a smart watch), a tablet computer, a laptop computer, and the like, with which embodiments of the disclosure may be practiced. With reference to FIG. 8A, one aspect of a mobile electronic device 800 for implementing the aspects is illustrated.

In a basic configuration, the mobile electronic device 800 is a handheld computer having both input elements and output elements. The mobile electronic device 800 typically includes a display 805 and one or more input buttons 810 that allow the user to enter information into the mobile electronic device 800. The display 805 of the mobile electronic device 800 may also function as an input device (e.g., a display that accepts touch and/or force input).

If included, an optional side input element 815 allows further user input. The side input element 815 may be a rotary switch, a button, or any other type of manual input element. In alternative aspects, mobile electronic device 800 may incorporate more or less input elements. For example, the display 805 may not be a touch screen in some embodiments. In yet another alternative embodiment, the mobile electronic device 800 is a portable phone system, such as a cellular phone. The mobile electronic device 800 may also include an optional keypad 835. Optional keypad 835 may be a physical keypad or a "soft" keypad generated on the touch screen display.

In various embodiments, the output elements include the display 805 for showing a graphical user interface (GUI), a visual indicator 820 (e.g., a light emitting diode), and/or an audio transducer 825 (e.g., a speaker). In some aspects, the mobile electronic device 800 incorporates a vibration transducer for providing the user with tactile feedback. In yet another aspect, the mobile electronic device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile electronic device 800. That is, the mobile electronic device 800 can incorporate a system (e.g., an architecture) 840 to implement some aspects. In one embodiment, the system 840 is implemented as a "smart phone" capable of running one or more applications (e.g., browser, e-mail, calendaring, contact managers, messaging clients, games, media clients/players, content selection and sharing applications and so on). In some aspects, the system 840 is integrated as an electronic device, such as an integrated personal digital assistant (PDA) and wireless phone.

One or more application programs 850 may be loaded into the memory 845 and run on or in association with the operating system 855. Examples of the application programs include phone dialer programs, e-mail programs, personal information management (PIM) programs, word processing programs, spreadsheet programs, Internet browser programs, messaging programs, and so forth.

The system 840 also includes a non-volatile storage area 860 within the memory 845. The non-volatile storage area 860 may be used to store persistent information (such as, for example, the authorization token, the identity token and/or the globally unique identifier) that should not be lost if the system 840 is powered down.

The application programs 850 may use and store information in the non-volatile storage area 860, such as email or other messages used by an email application, and the like. A synchronization application (not shown) also resides on the system 840 and is programmed to interact with a corresponding synchronization application resident on a host computer to keep the information stored in the non-volatile storage area 860 synchronized with corresponding information stored at the host computer.

The system 840 has a power supply 865, which may be implemented as one or more batteries. The power supply 865 may further include an external power source, such as an AC adapter or a powered docking cradle that supplements or recharges the batteries.

The system 840 may also include a radio interface layer 870 that performs the function of transmitting and receiving radio frequency communications. The radio interface layer 870 facilitates wireless connectivity between the system 840 and the "outside world," via a communications carrier or service provider. Transmissions to and from the radio interface layer 870 are conducted under control of the operating system 855. In other words, communications received by the radio interface layer 870 may be disseminated to the application programs 850 via the operating system 855, and vice versa.

The visual indicator 820 may be used to provide visual notifications, and/or an audio interface 875 may be used for producing audible notifications via an audio transducer (e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 865 so that when activated, they remain on for a duration dictated by the notification mechanism even though the processor 885 and other components might shut down for conserving battery power. The LED may be programmed to remain on indefinitely until the user takes action to indicate the powered-on status of the device.

The audio interface 875 is used to provide audible signals to and receive audible signals from the user. For example, in addition to being coupled to the audio transducer 825, the audio interface 875 may also be coupled to a microphone to receive audible input, such as to facilitate a telephone conversation. In accordance with embodiments of the present disclosure, the microphone may also serve as an audio sensor to facilitate control of notifications, as will be described below.

The system 840 may further include a video interface 880 that enables an operation of peripheral device 830 (e.g., on-board camera) to record still images, video stream, and the like.

A mobile electronic device 800 implementing the system 840 may have additional features or functionality. For example, the mobile electronic device 800 may also include additional data storage devices (removable and/or non-removable) such as, magnetic disks, optical disks, or tape. Such additional storage is illustrated in FIG. 8B by the non-volatile storage area 860.

Data/information generated or captured by the mobile electronic device 800 and stored via the system 840 may be stored locally on the mobile electronic device 800, as described above, or the data may be stored on any number of storage media that may be accessed by the device via the radio interface layer 870 or via a wired connection between the mobile electronic device 800 and a separate electronic device associated with the mobile electronic device 800, for example, a server computer in a distributed computing network, such as the Internet. As should be appreciated such data/information may be accessed via the mobile electronic device 800 via the radio interface layer 870 or via a distributed computing network. Similarly, such data/information may be readily transferred between electronic devices for storage and use according to well-known data/information transfer and storage means, including electronic mail and collaborative data/information sharing systems.

As should be appreciated, FIG. 8A and FIG. 8B are described for purposes of illustrating the present methods and systems and is not intended to limit the disclosure to a particular sequence of steps or a particular combination of hardware or software components.

Figure 9:
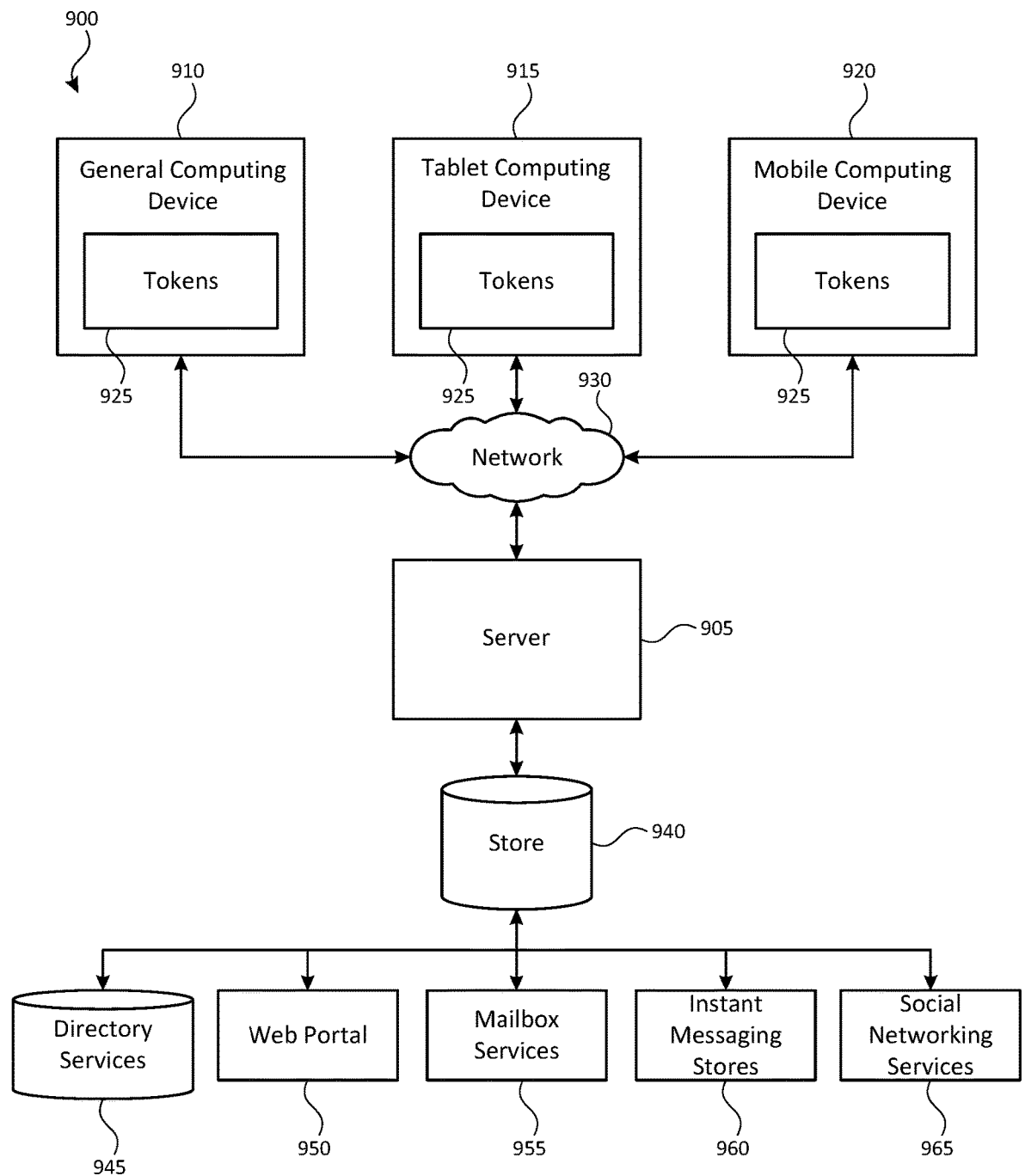
FIG. 9 is a block diagram of a distributed computing system in which aspects of the present disclosure may be practiced.

FIG. 9 illustrates one aspect of the architecture of a system 900 for establishing a communication session between a client device and a backend server 905. The client device may be a general computing device 910 (e.g., personal computer), tablet computing device 915, or mobile computing device 920. Each of these devices may store the various tokens 925 described above. For example, these tokens 925 include an authorization token, an identity token and a globally unique identifier that assist the client device in establishing an authoring session with a stateful host or other cloud service.

Various other types on content associated with the client device may be stored by or transmitted to a directory service 945, a web portal 950, mailbox services 955, instant messaging stores 960, or social networking services 965.

To establish an authoring session such as described, the client devices may communicate the tokens with to the server 905. For example, the general computing device 910, the tablet computing device 915 and/or the mobile computing device 920 (e.g., a smart phone) may send these tokens to the server 905 through a network 930.

As should be appreciated, FIG. 9 is described for purposes of illustrating the present methods and systems and is not intended to limit the disclosure to a particular sequence of steps or a particular combination of hardware or software components.

Figure 10:
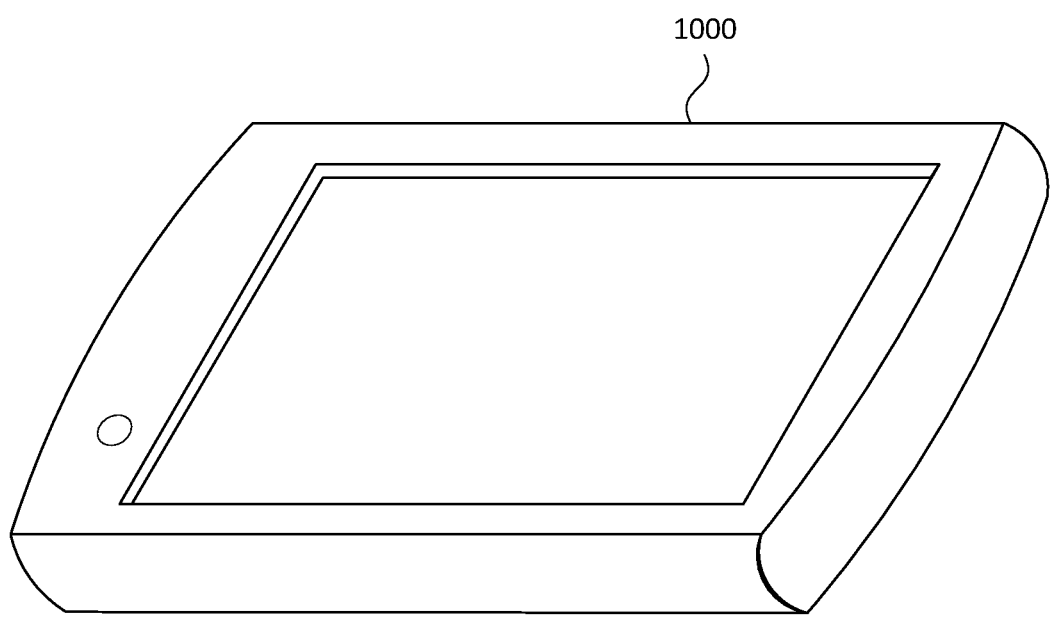
FIG. 10 illustrates another example electronic device for executing one or more aspects of the present disclosure.

FIG. 10 illustrates an example tablet electronic device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated electronic device is equipped with detection (e.g., camera) functionality for capturing and interpreting user gestures for controlling the functionality of the electronic device, and the like.

As should be appreciated, FIG. 10 is described for purposes of illustrating the present methods and systems and is not intended to limit the disclosure to a particular sequence of steps or a particular combination of hardware or software components.

Among other examples, the present disclosure describes a method for establishing a communication session between a client device and a stateful host, comprising: providing an identity token to an authorization service; determining, using the identity token, whether the client device is authorized to establish an authoring session with the stateful host hosted by a cloud service; when it is determined that the client device is authorized to establish the authoring session, generating an authorization token that includes a unique identifier associated with the client device; generating a stateful host on a virtual machine; associating the unique identifier with the stateful host; determining an internet protocol address associated with the stateful host; associating the internet protocol address with the unique identifier to create a name-value pair; securely storing the name-value pair in the cloud service; and using the name-value pair to establish the communication session between the client device and the stateful host. In further examples, the authorization token and the unique identifier are provided to the client device. In further examples, the client device provides the unique identifier to a gateway to establish a subsequent secure communication session with the stateful host. In further examples, the unique identifier is used to determine the name-value pair associated with the stateful host. In further examples, the authorization token is encrypted. In further examples, the unique identifier is used to create a one-to-one mapping between the client device and the stateful host. In further examples, the name-value pair is stored in a secure global storage device.

Further aspects disclosed herein provide a system, comprising: a processor; and a memory for storing instructions which, when executed by the processor, performs a method for establishing a communication session between a client device and stateful host, comprising: receiving a unique identifier from a client device, the unique identifier being associated with a client identification token and a client authorization token; using the unique identifier to determine an internet protocol address for a stateful host associated with the client device; and establishing the communication session between the client device and the stateful host using the unique identifier, the client identification token and the client authorization token. In further examples, using the unique identifier to determine an internet protocol address comprises accessing a storage cache that stores name-value pairs comprising a plurality of unique identifiers and a plurality of internet protocol addresses. In further examples, the stateful host is instantiated by a virtual machine. In further examples, the system further comprises instructions for reestablishing a connection between the client device and the stateful host when a connection between the client device and the stateful host is lost, wherein the connection is reestablished by using the unique identifier to determine the internet protocol address for the stateful host. In further examples, the system comprises instructions for determining whether the stateful host is inactive. In further examples, the system comprises instructions for causing a virtual machine to create a new instantiation of the stateful host when it is determined the stateful host is inactive. In further examples, the system comprises instructions for loading a last known state of the content hosted by the stateful host using, at least, the unique identifier.

Additional aspects disclosed herein describe a computer-readable storage medium comprising computer-executable instructions which, when executed by a processor, performs a method for establishing a communication session between a client and a stateful host, comprising: generating an authorization token that includes a unique identifier associated with the client; using the unique identifier to instantiate the stateful host on a virtual machine; determining an internet protocol address associated with the stateful host; associating the internet protocol address with the unique identifier to create a name-value pair; and using the name-value pair to establish the communication session between the client and the stateful host. In further examples, the computer-readable storage medium further comprises instructions for providing the unique identifier to the client. In further examples, the computer-readable storage medium further comprises instructions for determining whether the stateful host is inactive. In further examples, the computer-readable storage medium further comprises instructions for determining a last known state of the stateful host using the unique identifier when a connection to the stateful host is reestablished. In further examples, the computer-readable storage medium further comprises instructions for associating the authorization token with an authentication token associated with the client. In further examples, the computer-readable storage medium further comprises receiving the authorization token, the authentication token and the unique identifier when the client seeks to reestablish a connection with the stateful host.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for establishing a communication session between a client device and a stateful host, comprising:
   determining that a unique identifier has been added to an instruction queue, the unique identifier being associated with a client identification token and a client authorization token;
   generating a stateful host on a virtual machine;
   associating the unique identifier with the stateful host;
   determining an internet protocol address associated with the stateful host;
   associating the internet protocol address with the unique identifier to create a name-value pair, the name-value pair being used to establish the communication session between the client device and the stateful host; and
   providing the name-value pair for securely storing in the cloud service.

2. The method of claim 1, wherein the authorization token and the unique identifier are received from the client device.

3. The method of claim 2, further comprising establishing a subsequent secure communication session with the stateful host using the unique identifier.

4. The method of claim 3, wherein the unique identifier is used to determine the name-value pair associated with the stateful host.

5. The method of claim 1, wherein the authorization token is encrypted.

6. The method of claim 1, wherein the unique identifier is used to create a one-to-one mapping between the client device and the stateful host.

7. The method of claim 1, wherein the name-value pair is stored in a secure global storage device.

8. A system, comprising:
   a processor; and
   a memory for storing instructions which, when executed by the processor, performs a method for establishing a communication session between a client device and stateful host, comprising:
      receiving a unique identifier from the client device, the unique identifier being associated with a client identification token and a client authorization token;
      using the unique identifier to determine an internet protocol address for the stateful host associated with the client device by accessing a storage cache that stores a name-value pair comprising the unique identifier associated with the client device and the internet protocol address associated with the stateful host; and establishing the communication session between the client device and the stateful host using the unique identifier, the client identification token and the client authorization token.

9. The system of claim 8, wherein the stateful host is instantiated by a virtual machine.

10. The system of claim 8, further comprising instructions for reestablishing a connection between the client device and the stateful host when a connection between the client device and the stateful host is lost, wherein the connection is reestablished by using the unique identifier to determine the internet protocol address for the stateful host.

11. The system of claim 10, further comprising instructions for determining whether the stateful host is inactive.

12. The system of claim 11, further comprising instructions for causing a virtual machine to create a new instantiation of the stateful host when it is determined the stateful host is inactive.

13. The system of claim 11, further comprising instructions for loading a last known state of the content hosted by the stateful host using, at least, the unique identifier.

14. A computer-readable storage medium comprising computer-executable instructions which, when executed by a processor, performs a method for establishing a communication session between a client and a stateful host, comprising:
    determining that a unique identifier has been added to an instruction queue, the unique identifier being associated with an authorization token;
    using the unique identifier to instantiate the stateful host on a virtual machine;
    determining an internet protocol address associated with the stateful host; and
    associating the internet protocol address with the unique identifier to create a name-value pair, the name-value pair being used to establish the communication session between the client and the stateful host.

15. The computer-readable storage medium of claim 14, wherein the unique identifier is associated with the client.

16. The computer-readable storage medium of claim 14, further comprising instructions for determining whether the stateful host is inactive.

17. The computer-readable storage medium of claim 14, further comprising instructions for determining a last known state of the stateful host using the unique identifier when a connection to the stateful host is reestablished.

18. The computer-readable storage medium of claim 14, the unique identifier being further associated with an authentication token associated with the client.

19. The computer-readable storage medium of claim 18, further comprising receiving the authorization token, the authentication token and the unique identifier when the client seeks to reestablish a connection with the stateful host.

20. The system of claim 8, wherein the unique identifier is used to create a one-to-one mapping between the client device and the stateful host.

* * * * *